US009804843B1

(12) United States Patent
Chu

(10) Patent No.: US 9,804,843 B1
(45) Date of Patent: Oct. 31, 2017

(54) METHOD AND APPARATUS FOR LINEAR FUNCTION PROCESSING IN PIPELINED STORAGE CIRCUITS

(71) Applicant: Altera Corporation, San Jose, CA (US)

(72) Inventor: Pohrong Rita Chu, Saratoga, CA (US)

(73) Assignee: Altera Corporation, San Jose, CA (US)

( * ) Notice: Subject to any disclaimer, the term of this patent is extended or adjusted under 35 U.S.C. 154(b) by 566 days.

(21) Appl. No.: 14/478,335

(22) Filed: Sep. 5, 2014

(51) Int. Cl.
| | |
|---|---|
| G06F 12/00 | (2006.01) |
| G06F 9/30 | (2006.01) |
| G06F 17/50 | (2006.01) |
| H03K 19/177 | (2006.01) |
| G06F 3/06 | (2006.01) |
| G06F 9/38 | (2006.01) |

(52) U.S. Cl.
CPC .......... *G06F 9/3004* (2013.01); *G06F 3/0604* (2013.01); *G06F 3/0655* (2013.01); *G06F 3/0683* (2013.01); *G06F 9/30105* (2013.01); *G06F 9/38* (2013.01); *G06F 17/5054* (2013.01); *G06F 17/5081* (2013.01); *H03K 19/177* (2013.01); *G06F 2003/0697* (2013.01)

(58) Field of Classification Search
CPC .. G06F 3/0655; G06F 3/0683; G06F 9/30105; G06F 9/38; G06F 9/3004

USPC ........................................................ 711/155
See application file for complete search history.

(56) References Cited

U.S. PATENT DOCUMENTS

| | | | |
|---|---|---|---|
| 6,804,162 B1 | 10/2004 | Eldridge et al. | |
| 6,934,951 B2 | 8/2005 | Wilkinson, III et al. | |
| 7,236,421 B1 | 6/2007 | Eldridge et al. | |
| 7,302,549 B2 | 11/2007 | Wilkinson, III et al. | |
| 7,379,068 B2 | 5/2008 | Radke | |
| 7,657,855 B1 * | 2/2010 | Manaker, Jr. | G06F 17/5031 716/103 |
| 7,971,030 B2 * | 6/2011 | O'Sullivan | G06F 9/3004 712/31 |
| 2014/0173342 A1 * | 6/2014 | Kaushikkar | G06F 11/273 714/30 |

* cited by examiner

*Primary Examiner* — Pierre-Michel Bataille
(74) *Attorney, Agent, or Firm* — Treyz Law Group, P.C.; Joseph F. Guihan

(57) ABSTRACT

An integrated circuit may have processing and storage circuits that perform read-modify-write operations on a wide data path. A CAD tool may partition the wide data path into data path subsets based on the width of the wide data path, the characteristics of the processing and storage circuits, and various constraints such as resource constraints and timing constraints. The CAD tool may also instantiate corresponding pipelined circuitry. The pipelined circuitry may be arranged in slices with cascaded processing and storage circuits. Each processing and storage circuit in a slice may perform a read-modify-write operation based on the corresponding data path subset and any prior result produced by other processing and storage circuits.

20 Claims, 9 Drawing Sheets

METHOD AND APPARATUS FOR LINEAR FUNCTION PROCESSING IN PIPELINED STORAGE CIRCUITS

BACKGROUNDS

This relates to integrated circuits and, more particularly, to processing linear functions in pipelined storage blocks in an integrated circuit.

Consider a programmable logic device (PLD) as one example of an integrated circuit. As applications for which PLDs are used increase in complexity, it has become more common to design PLDs to include specialized blocks such as storage blocks in addition to blocks of generic programmable logic.

Storage blocks are often arranged in arrays of memory elements. In a typical array, data lines are used to write data into and read data from the storage blocks. Address lines may be used to select which of the memory elements are being accessed. A storage block in a PLD is typically configurable to implement a memory of a given depth and width, whereby the maximum depth is based on the number of address lanes and the maximum width on the number of data lanes.

Many common memory operations are executed inefficiently using these storage blocks. For example, read-modify-write operations where data is retrieved from memory, modified, and written back to memory may require several clock cycles to complete. Caching circuitry that keeps track of recent operations and ensures that only up-to-date data is used in subsequent operations is commonly used to work around the multi-cycle problem at the expense of increased circuit area. However, some applications are pushing for even higher speed and higher bandwidth and the current caching circuitry is not scalable.

SUMMARY

In accordance with certain aspects of the invention, an integrated circuit with a plurality of inputs, an output, a storage circuit, a processing circuit, and at least one pipeline register is presented.

The processing circuit may receive a subset of the input data from an input of the plurality of inputs and stored data from a storage circuit, generate output data based on the subset of input data, and write the output data to the storage circuit and to the output. At least one pipeline register may be coupled between the processing circuit and the storage circuit.

It is appreciated that the present invention can be implemented in numerous ways, such as a process, an apparatus, a system, a device, or instructions executed on a programmable processor. Several inventive embodiments are described below.

In certain embodiments, the above-mentioned integrated circuit may further include an additional processing circuit. The additional processing circuit may receive an additional subset of input data from an additional input of the plurality of inputs, additional stored data from an additional storage circuit, and the output data from the processing circuit. If desired, the additional processing circuit may generate additional output data based on the additional subset of input data, the additional stored data, and the output data.

In certain embodiments, the above-mentioned integrated circuit may further include at least one pipeline register between the processing circuit and the additional processing circuit and/or between the additional input and the additional processing circuit and/or between the processing circuit and the output.

If desired, the processing circuit may execute a linear function on the subset of the input data to generate the output data. The linear function may be selected from the group consisting of addition, multiplication, subtraction, and division.

Further features of the invention, its nature and various advantages, will be more apparent from the accompanying drawings and the following detailed description of the preferred embodiments.

DETAILED DESCRIPTION

The present invention relates to integrated circuits and more specifically to processing linear functions using pipelined storage blocks in an integrated circuit.

Many networking applications such as monitoring transmission channel congestion or collecting statistics about packets in a queue may require the use of storage blocks. However, many common memory operations that are performed by these applications are executed inefficiently. For example, read-modify-write operations where data is retrieved from memory, modified, and written back to memory often requires several clock cycles to complete. The fact that some applications have a data path that is wider than the interface of available storage circuits may further exacerbate the problem. Consequently, it may be desirable to implement pipelined circuitry with cascaded processing and storage circuits that execute common memory operations more efficiently. As an example, the data path may be partitioned into subsets and each of the cascaded processing and storage circuits may operate on one of the subsets.

It will be recognized by one skilled in the art, that the present exemplary embodiments may be practiced without some or all of these specific details. In other instances, well-known operations have not been described in detail in order not to unnecessarily obscure the present embodiments.

Figure 1:
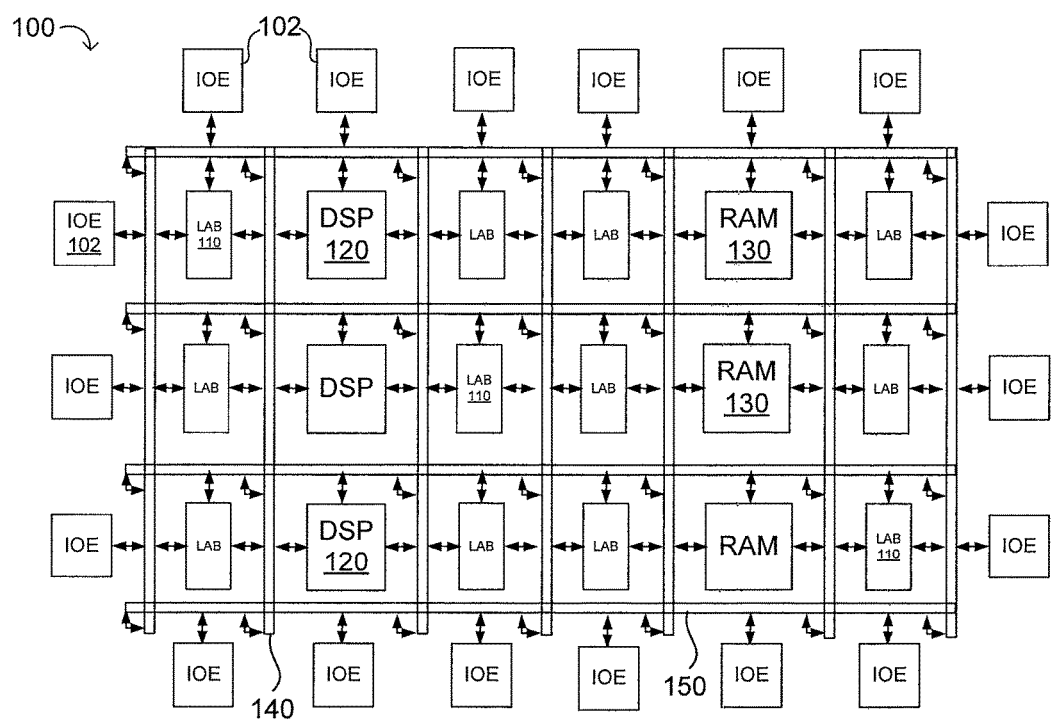
FIG. 1 is a diagram of an illustrative integrated circuit with embedded configurable storage circuit in accordance with an embodiment.

An illustrative embodiment of an integrated circuit such as a programmable logic device (PLD) 100 with a modified configurable storage block in accordance with the present invention is shown in FIG. 1. Programmable logic device 100 may have input-output (I/O) circuitry 102 for driving signals off of PLD 100 and for receiving signals from other devices. Input-output (I/O) circuitry 102 may include conventional input-output (I/O) circuitry, serial data transceiver circuitry, differential receiver and transmitter circuitry, or other circuitry used to connect one integrated circuit to another integrated circuit.

As shown, input-output (I/O) elements 102 may be located around the periphery of the chip. If desired, the programmable logic device may have input-output (I/O) elements 102 arranged in different ways. For example, input-output (I/O) elements 102 may form one or more columns of input-output (I/O) elements that may be located anywhere on the programmable logic device (e.g., distributed evenly across the width of the PLD). If desired, input-output (I/O) elements 102 may form one or more rows of input-output (I/O) elements (e.g., distributed across the height of the PLD). Alternatively, input-output (I/O) elements 102 may form islands of input-output (I/O) elements that may be distributed over the surface of the PLD or clustered in selected areas.

Vertical interconnection resources 140 and horizontal interconnection resources 150 such as global and local vertical and horizontal conductive lines and buses may be used to route signals on PLD 100. Vertical and horizontal interconnection resources 140 and 150 include conductive lines and programmable connections between respective conductive lines and are therefore sometimes referred to as programmable interconnects.

Programmable logic regions may include programmable components such as digital signal processing circuitry 120, storage circuitry 130, or other combinational and sequential logic circuitry organized in logic array blocks 110. The programmable logic regions may be configured to perform a custom logic function. If desired, the programmable logic region may include digital signal processing circuitry 120 and storage circuitry 130 which both may be organized in specialized blocks that have limited configurability. The programmable logic region may include additional specialized blocks such as programmable phase-locked loop circuitry, programmable delay-locked loop circuitry, or other specialized blocks with limited configurability.

Programmable logic device 100 contains programmable memory elements. These memory elements can be loaded with configuration data (sometimes also referred to as programming data) using input-output (I/O) circuitry 102. Once loaded, the memory elements each provide a corresponding static control signal that controls the operation of an associated logic component in a programmable logic region. In a typical scenario, the outputs of the loaded memory elements are applied to the gates of transistors in the programmable logic region to turn certain transistors on or off and thereby configure the logic and the routing paths in the programmable logic region. Programmable logic circuit elements that may be controlled in this way include parts of multiplexers (e.g., multiplexers used for forming routing paths in programmable interconnects), look-up tables, logic arrays, AND, OR, NAND, and NOR logic gates, pass gates, etc.

Memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements are loaded with configuration data during programming, memory elements are sometimes referred to as configuration memory, configuration RAM, or programmable memory elements.

The circuitry of programmable logic device 100 may be organized using any suitable architecture. As an example, the logic of programmable logic device 100 may be organized in a series of rows and columns of larger programmable logic regions each of which contains multiple smaller logic regions. The smaller regions may be, for example, regions of logic that are sometimes referred to as logic elements (LEs) or basic logic elements (BLEs), each containing a look-up table, one or more registers, and programmable multiplexer circuitry. The smaller regions may also be, for example, regions of logic that are sometimes referred to as adaptive logic modules (ALMs), configurable logic blocks (CLBs), slice, half-slice, etc. Each adaptive logic module may include a pair of adders, a pair of associated registers and a look-up table or other block of shared combinational logic (i.e., resources from a pair of LEs—sometimes referred to as adaptive logic elements or ALEs in this context). The larger regions may be, for example, logic array blocks (LABs) or logic clusters of regions of logic containing multiple logic elements or multiple ALMs.

During device programming, configuration data is loaded into programmable logic device 100 that configures the programmable logic regions so that their logic resources perform desired logic functions. For example, programmable logic device 100 may be configured to implement read-modify-write operations on a wide data path.

Figure 2:
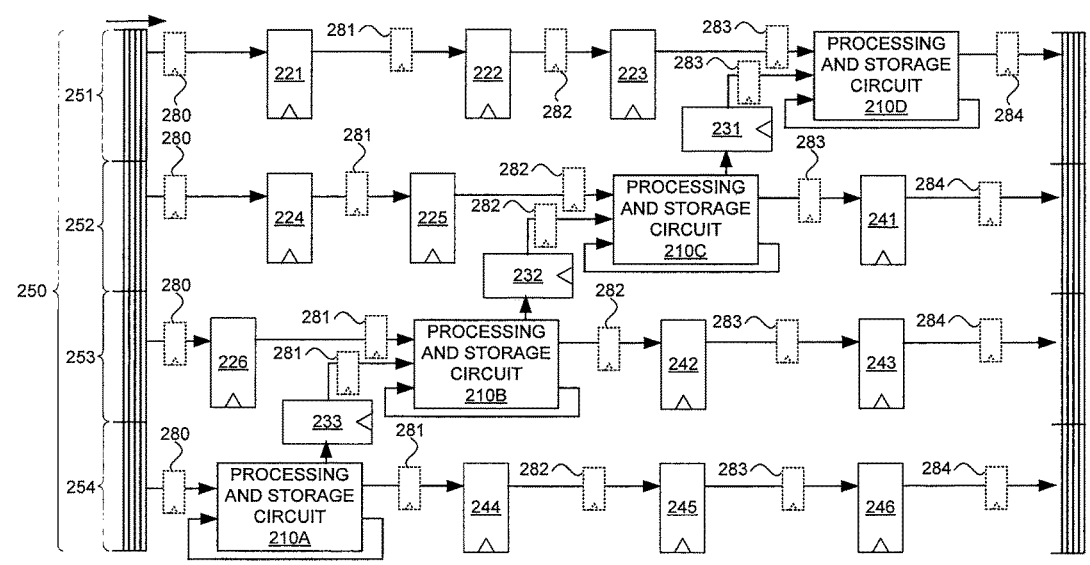
FIG. 2 is a diagram of illustrative pipelined circuitry with partitioned input data and cascaded processing and storage circuits in accordance with an embodiment.

FIG. 2 is a diagram of illustrative pipelined circuitry with partitioned input data and cascaded processing and storage circuits that may implement read-modify-write operations in accordance with an embodiment. The pipelined circuitry may include cascaded processing and storage circuits 210A, 210B, 210C, and 210D, and pipeline registers 221, 222, 223, 224, 225, 226, 231, 232, 233, 241, 242, 243, 244, 245, and 246.

As shown, the pipelined circuitry may receive signals from a wide data path 250. As an example, a transceiver (e.g., serial data transceiver circuitry in input-output (I/O) circuitry 102 of FIG. 1) may receive serial data at a data rate of 25 Gigabits per second (Gbps). A de-serializer circuit may parallelize the received serial data onto a 100 bit wide data path with each bit slice of the data path operating at a data rate of 250 MHz.

For example, circuitry to monitor congestion or collect statistics about the data received over the wide data path may process and store information based on the data received over the wide data path. For this purpose, a computer-aided design (CAD) tool may partition the wide data path 250 into data path subsets 251, 252, 253, and 254, thereby partitioning the signals into subsets of signals.

A first processing and storage circuit 210A may receive a first subset of signals from data path subset 254, execute a first signal processing operation based on the first subset of signals and signals based on stored data that is retrieved from the first processing and storage circuit 210A, and store the result of the first signal processing operation in registers 233 and 244, respectively.

In some embodiments, register 233 may store a first portion of the result (e.g., a carry signal), while register 244 stores a second portion of the result. However, in order not to unnecessarily obscure the present embodiments, we assume that a register between a first and second processing circuit always stores the entire result computed by the first processing circuit and that the second processing circuit always receives the entire result stored in that register. If desired, the first processing and storage circuit 210A may override the stored data that was retrieved from the first processing and storage circuit 210A with the result of the first signal processing operation, thereby performing a read-modify-write operation.

If desired, the pipelined circuitry may be further pipelined. As an example, the pipelined circuitry may implement a first optional pipeline stage using pipeline registers 280. Similarly, the pipelined circuitry may implement a second, third, fourth, and fifth optional pipeline stage using pipeline registers 281, 282, 283, and 284, respectively.

If desired, each of these optional pipeline stages may effectively implement more than one pipeline stage. For example, each pipeline register 281 may represent three registers coupled in series. Thus, the second pipeline stage may effectively implement three pipeline stages.

A second processing and storage circuit 210B may receive a second subset of signals from data path subset 253 and pipeline register 226. The second processing and storage circuit 210B may also receive the result of the first signal processing operation from pipeline register 233 and execute a signal processing operation based on the second subset of signals, the result of the first signal processing operation, and/or additional signals based on stored data that is retrieved from the first processing and storage circuit 210B. The second processing and storage circuit 210B may store the result of the second signal processing operation in registers 232 and 242, respectively. If desired, the second processing and storage circuit 210B may override the stored data that was retrieved from the first processing and storage circuit 210B with the result of the second signal processing operation, thereby performing a second read-modify-write operation.

As shown, the cascaded processing and storage circuits 210C and 210D may receive third and fourth subsets of signals from data path subsets 252 and 251, respectively, and from storage circuitry within the third and fourth processing and storage circuits 210C and 210D. The third and fourth processing and storage circuits 210C and 210D may also receive the result of the second and third signal processing operations from pipeline registers 232 and 231, respectively, and execute a signal processing operation based on the received signals.

The third processing and storage circuit 210C may store the result of the third signal processing operation in registers 231 and 241. If desired, the third and fourth processing and storage circuits 210C and 210D may override the stored data that was retrieved from the first processing and storage circuits 210C and 210D with the result of the third and fourth signal processing operations, respectively, thereby performing third and fourth read-modify-write operations.

The duration of the signal processing operation on signals received from wide data path 250 may increase with the width of the data path. Partitioning the data path into data path subsets and handling the signals received from the respective data path subsets (i.e., from data path subsets 254, 253, 252, and 251) using the cascaded processing and storage circuits 210A-210D may enable each cascaded processing and storage circuit 210A-210D to finish the respective read-modify-write operation within one clock cycle. The number of data path subsets may depend on the duration of a read-modify-write operation. If desired, the data path partitioning may create as many data path subsets as needed such that the respective read-modify-write operation may terminate within one clock cycle, thereby increasing the number of data paths and thus latency for the benefit of having single clock cycle read-modify-write operations.

Figure 3A:
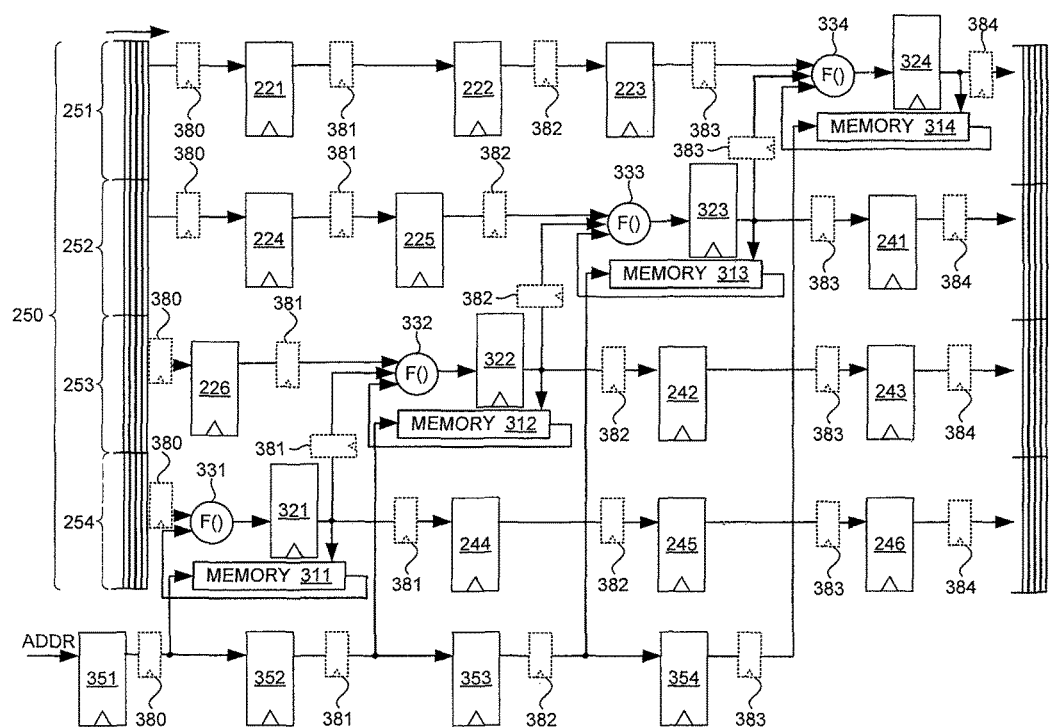
FIG. 3A is a diagram of illustrative pipelined circuitry with cascaded processing circuits that perform read-modify-write operations on partitioned input data in accordance with an embodiment.

Similar to FIG. 2, FIG. 3A is a diagram of illustrative pipelined circuitry with partitioned input data and cascaded processing and storage circuits that may implement read-modify-write operations in accordance with an embodiment. In FIG. 3A, each of the cascaded processing and storage circuits 210A-210D of FIG. 2 are replaced by circuitry that includes linear function elements 331, 332, 333, and 334, and memory circuits 311, 312, 313, and 314. As an example, each linear function element 331-334 may execute an addition operation, a multiplication operation, a subtraction operation, a division operation, or any combination thereof.

Each linear function element 331-334 receives signals from a portion of the data path (i.e., from data path subsets 251, 252, 253, and 254, respectively) and from a corresponding memory circuit 311-314. Except for the linear function element 331 that receives signals from data path subset 254, each linear function element 332-334 also receives the result of a linear function executed by another linear function element. Each linear function element 331-334 processes the received signals by executing a linear function.

For example, in the event that the linear function element 331-334 execute an addition, each linear function element 332-334 may receive the carry signal computed by linear function elements 331-333, respectively. Accordingly, registers 244, 242, 241, and an output may receive the sum signal computed by linear function elements 331-334, respectively.

Memory circuits 311-314 may allow simultaneous read and write operation at the same address. For example, memory circuits 311-314 may implement a simple dual-port memory mode in which data is written to a first port (i.e., the write port) and read from a second port (i.e., the read port). Both the read port and the write port may be addressed independently. In the scenario of a read-modify-write operation, both the read port and the write port point to the same address at the same time. Memory circuits 311-314 may read the data that was previously stored at the address (i.e., the read operation provides old data). Alternatively, memory circuits 311-314 may read the data that is currently written to the address (i.e., the read operation provides new data). If desired, memory circuits 311-314 may be configurable to select between reading old data and reading new data.

Figure 3B:
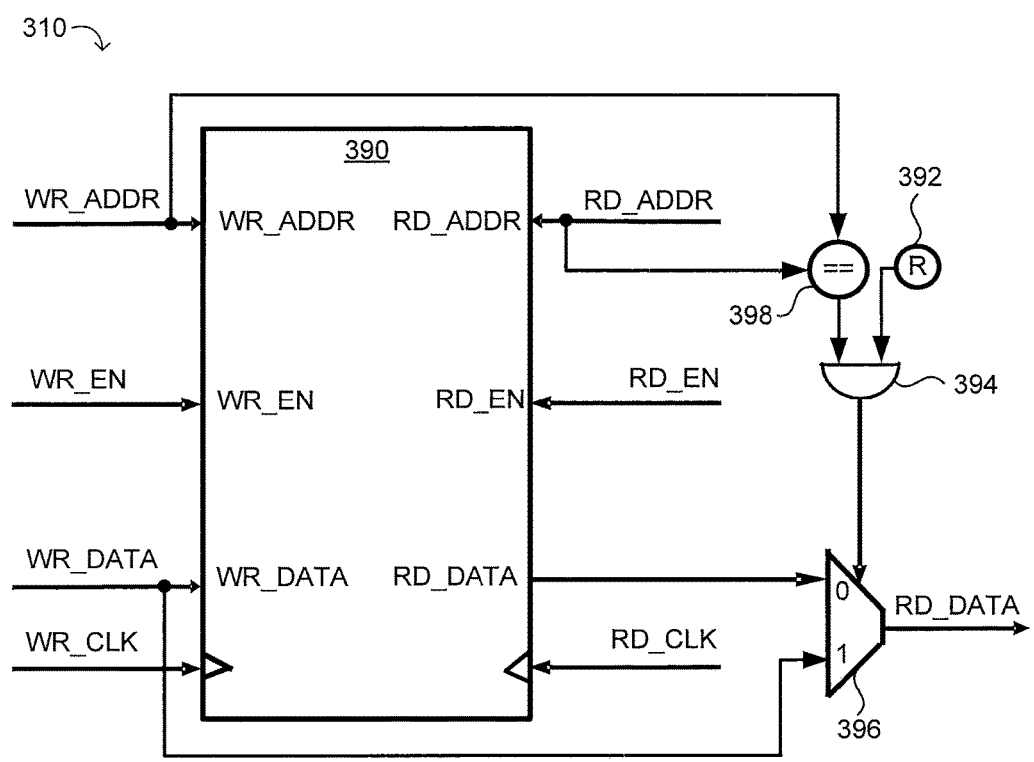
FIG. 3B is a diagram of an illustrative memory circuit with a memory array and bypass circuitry which can be configured to select between data that is currently stored in the memory array and data that is currently being written to the memory array.

Memory circuit 311-314 may include bypass circuitry that provides new data at the read port in the event that reading new data is selected. An embodiment of an illustrative memory circuit 310 with simple dual-port memory array 390 and bypass circuitry which can be configured to select between data that is currently stored in the memory array and data that is currently being written to the memory array is shown in FIG. 3B.

As shown, memory circuit 310 may include simple dual-port memory array 390 and bypass circuitry. Simple dual-port memory array 390 may have one read port and one write port and execute a read operation and a write operation at the same time. If desired, any memory array with more than one port may be used such as true dual-port memory, quad-port memory, etc. The bypass circuitry may include comparator 398, logic AND gate 394, programmable memory element 392, and multiplexer 396.

Comparator 398 may compare the read address RD_ADDR and the write address WR_ADDR bit-by-bit. As shown, comparator 398 may produce '1' in case that the read and write addresses are the same and '0' otherwise. Logic AND gate 394 and programmable memory element 392 may serve as configurable enable circuitry.

As shown, logic AND gate 394 may output '0' independent of whether the read and write addresses are the same if programmable memory element 392 stores '0'. Logic AND gate 394 may output '0' or '1' depending on whether the read and write addresses are different or the same if programmable memory element 392 stores '1'. If desired, logic AND gate 394 and programmable memory element 392 may be omitted. In this scenario, the bypass circuitry may always provide new data if the read and write addresses are the same.

Multiplexer 396 may select between data that is currently stored at the read address (i.e., old data from port RD_DATA of simple dual-port memory array 390) and data that is currently available at the write port (i.e., new data at port WR_DATA of simple dual-port memory array 390) based on the output of logic AND gate 394. In case that the read and write addresses are the same (i.e., RD_ADDR is equal to WR_ADDR), and programmable memory element 392 enables selection between old data and new data, multiplexer 396 may select new data (i.e., data that is currently at port WR_DATA). In the event that the read and write addresses are different or programmable memory element 392 disables selection between old data and new data, multiplexer 396 may select old data (i.e., data that is retrieved from port RD_DATA of memory array 390).

The respective memory circuits 311-314 of FIG. 3A may store all signals from data path subsets 251-254 at the same address (ADDR). For example, consider the scenario in which data path 250 receive a signal A at time '0'. Signal A may be partitioned into sub-signals A1, A2, A3, and A4, which are received at data path subsets 251, 252, 253, and 254, respectively. Consider further that memory circuits 311-314 store sub-signals A1, A2, A3, and A4 at address ADDR1. In this example, A1 may arrive at memory circuit 311 after one clock cycle. Thus, address ADDR1 may arrive at memory circuit 311 after one clock cycle as well. For this purpose, register 351 may delay address ADDR1 by one clock cycle. Similarly, registers 352, 353, and 354 may each delay address ADDR1 by one clock cycle such that address ADDR1 arrives at memory circuits 312, 313, and 314 after two, three, and four clock cycles, respectively.

If desired, the pipelined circuitry shown in FIG. 3A may be further pipelined similar to the pipelined circuitry illustrated in FIG. 2. As an example, the pipelined circuitry shown in FIG. 3A may implement a first optional pipeline stage using pipeline registers 380. Similarly, the pipelined circuitry may implement a second, third, fourth, and fifth optional pipeline stage using pipeline registers 381, 382, 383, and 384, respectively.

If desired, each of these optional pipeline stages may effectively implement more than one pipeline stage. For example, each pipeline register 381 may represent three registers coupled in series. Thus, the second pipeline stage may effectively implement three pipeline stages.

As shown in FIG. 3A, each pipeline stage may also pipeline the address signal accordingly.

Registers 321-324 may be placed at the output of the respective linear function elements 331-334 such that the path between linear function elements 331-334 and each path from linear function elements 331-334 to the respective memory circuit 311-314 (i.e., each read-modify-write operation) is register pipelined. Thus, each read-modify-write operation may use two clock cycles instead of one clock cycle. Alternatively, each linear function elements 331-334 may directly feed the corresponding memory circuits 311-314, respectively (not shown). Thus, each read-modify-write operation may use one clock cycle.

CAD tools in a circuit design system may evaluate whether all read-modify-write operations can be done in one or two clock cycles as illustrated in FIGS. 2 and 3, respectively. If a read-modify-write operation may not complete within the respective one or two clock cycles, the CAD tools may partition data path 250, and instantiate respective cascaded processing and storage circuitry 210A-210D or 331-334, 311-314, and 321-324. These steps (i.e., evaluating read-modify-write operations, data path partitioning, instantiating cascaded circuitry) may be repeated iteratively until all read-modify-write operations can be completed in one or two clock cycles, respectively.

Figure 4:
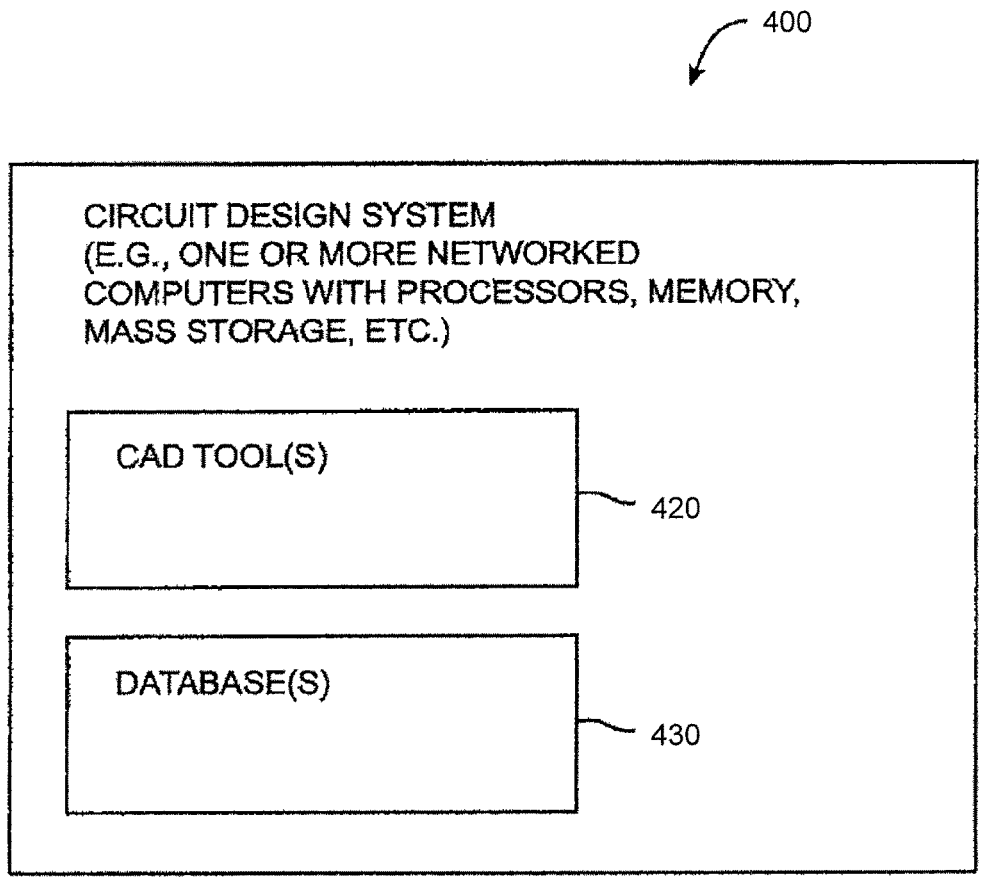
FIG. 4 is a diagram of a circuit design system that may be used to design integrated circuits in accordance with an embodiment.

An illustrative circuit design system 400 in accordance with the present invention is shown in FIG. 4. System 400 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 420 and databases 430 reside on system 400. During operation, executable software such as the software of computer aided design tools 420 runs on the processor(s) of system 400. Databases 430 are used to store data for the operation of system 400. In general, software and data may be stored on any computer-readable medium (storage) in system 400. Such storage may include computer memory chips, removable and fixed media such as hard disk drives, flash memory, compact discs (CDs), digital versatile discs (DVDs), blu-ray discs (BDs), other optical media, and floppy diskettes, tapes, or any other suitable memory or storage device(s). When the software of system 400 is installed, the storage of system 400 has instructions and data that cause the computing equipment in system 400 to execute various methods (processes). When performing these processes, the computing equipment is configured to implement the functions of the circuit design system.

The computer aided design (CAD) tools 420, some or all of which are sometimes referred to collectively as a CAD tool or an electronic design automation (EDA) tool, may be provided by a single vendor or by multiple vendors. Tools 420 may be provided as one or more suites of tools (e.g., a compiler suite for performing tasks associated with implementing a circuit design in a programmable logic device) and/or as one or more separate software components (tools). Database(s) 430 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 5:
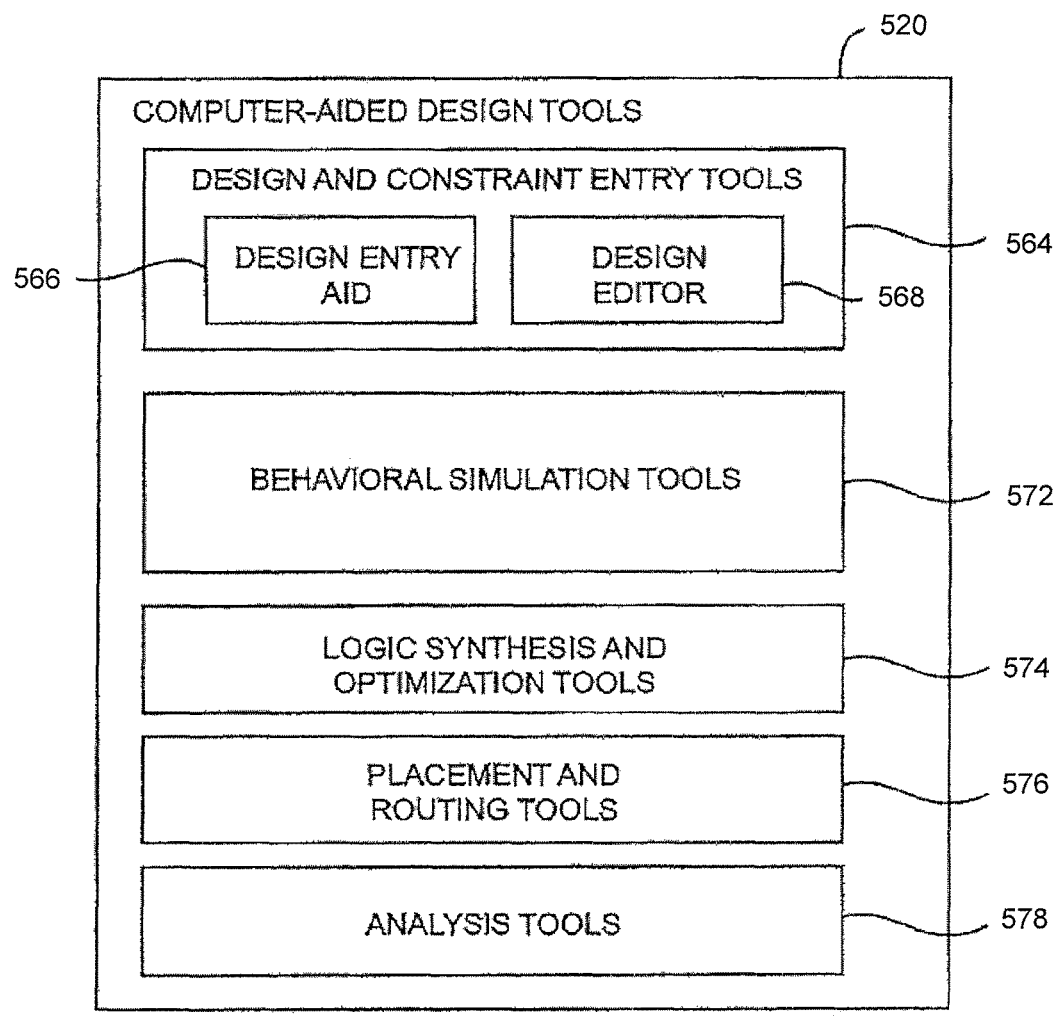
FIG. 5 is a diagram of illustrative computer-aided design (CAD) tools that may be used in a circuit design system in accordance with an embodiment.

Illustrative computer aided design tools 520 that may be used in a circuit design system such as circuit design system 400 of FIG. 4 are shown in FIG. 5.

The design process may start with the formulation of functional specifications of the integrated circuit design (e.g., a functional or behavioral description of the integrated circuit design). A circuit designer may specify the functional operation of a desired circuit design using design and constraint entry tools 564. Design and constraint entry tools 564 may include tools such as design and constraint entry aid 566 and design editor 568. Design and constraint entry aids such as aid 566 may be used to help a circuit designer locate a desired design from a library of existing circuit designs and may provide computer-aided assistance to the circuit designer for entering (specifying) the desired circuit design.

As an example, design and constraint entry aid 566 may be used to present screens of options for a user. The user may click on on-screen options to select whether the circuit being designed should have certain features. Design editor 568 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 564 may be used to allow a circuit designer to provide a desired circuit design using any suitable format. For example, design and constraint entry tools 564 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 564 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 564 may allow the circuit designer to provide a circuit design to the circuit design system 400 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 568. Blocks of code may be imported from user-maintained or commercial libraries if desired.

After the design has been entered using design and constraint entry tools 564, behavioral simulation tools 572 may be used to simulate the functional performance of the circuit design. If the functional performance of the design is incomplete or incorrect, the circuit designer can make changes to the circuit design using design and constraint entry tools 564. The functional operation of the new circuit design may be verified using behavioral simulation tools 572 before synthesis operations have been performed using tools 574. Simulation tools such as behavioral simulation tools 572 may also be used at other stages in the design flow if desired (e.g., after logic synthesis). The output of the behavioral simulation tools 572 may be provided to the circuit designer in any suitable format (e.g., truth tables, timing diagrams, etc.).

Once the functional operation of the circuit design has been determined to be satisfactory, logic synthesis and optimization tools 574 may generate a gate-level netlist of the circuit design, for example using gates from a particular library pertaining to a targeted process supported by a foundry, which has been selected to produce the integrated circuit. Alternatively, logic synthesis and optimization tools 574 may generate a gate-level netlist of the circuit design using gates of a targeted programmable logic device (i.e., in the logic and interconnect resources of a particular programmable logic device product or product family).

Logic synthesis and optimization tools 574 may optimize the design by making appropriate selections of hardware to implement different logic functions in the circuit design based on the circuit design data and constraint data entered by the logic designer using tools 564.

After logic synthesis and optimization using tools 574, the circuit design system may use tools such as placement and routing tools 576 to perform physical design steps (layout synthesis operations). Placement and routing tools 576 are used to determine where to place each gate of the gate-level netlist produced by tools 574. For example, if two counters interact with each other, the placement and routing tools 576 may locate these counters in adjacent regions to reduce interconnect delays or to satisfy timing requirements specifying the maximum permitted interconnect delay. The placement and routing tools 576 create orderly and efficient implementations of circuit designs for any targeted integrated circuit (e.g., for a given programmable integrated circuit such as a field-programmable gate array (FPGA).)

Tools such as tools 574 and 576 may be part of a compiler suite (e.g., part of a suite of compiler tools provided by a programmable logic device vendor). In accordance with the present invention, tools such as tools 574, 576, and 578 may also include timing analysis tools such as timing estimators. This allows tools 574 and 576 to satisfy performance requirements (e.g., timing requirements) before actually producing the integrated circuit. As an example, tools 574 and 576 may partition data paths into subsets of data paths and instantiate additional cascaded processing and storage circuitry for each newly created subset of data paths. If desired, tools 574 and 576 may register pipeline selected paths in order to provide for higher clock rates in exchange for increased latency.

After an implementation of the desired circuit design has been generated using placement and routing tools 576 the implementation of the design may be analyzed and tested using analysis tools 578. After satisfactory optimization operations have been completed using tools 520 and depending on the targeted integrated circuit technology, tools 520 may produce a mask-level layout description of the integrated circuit or configuration data for programming the programmable logic device.

Figure 6:
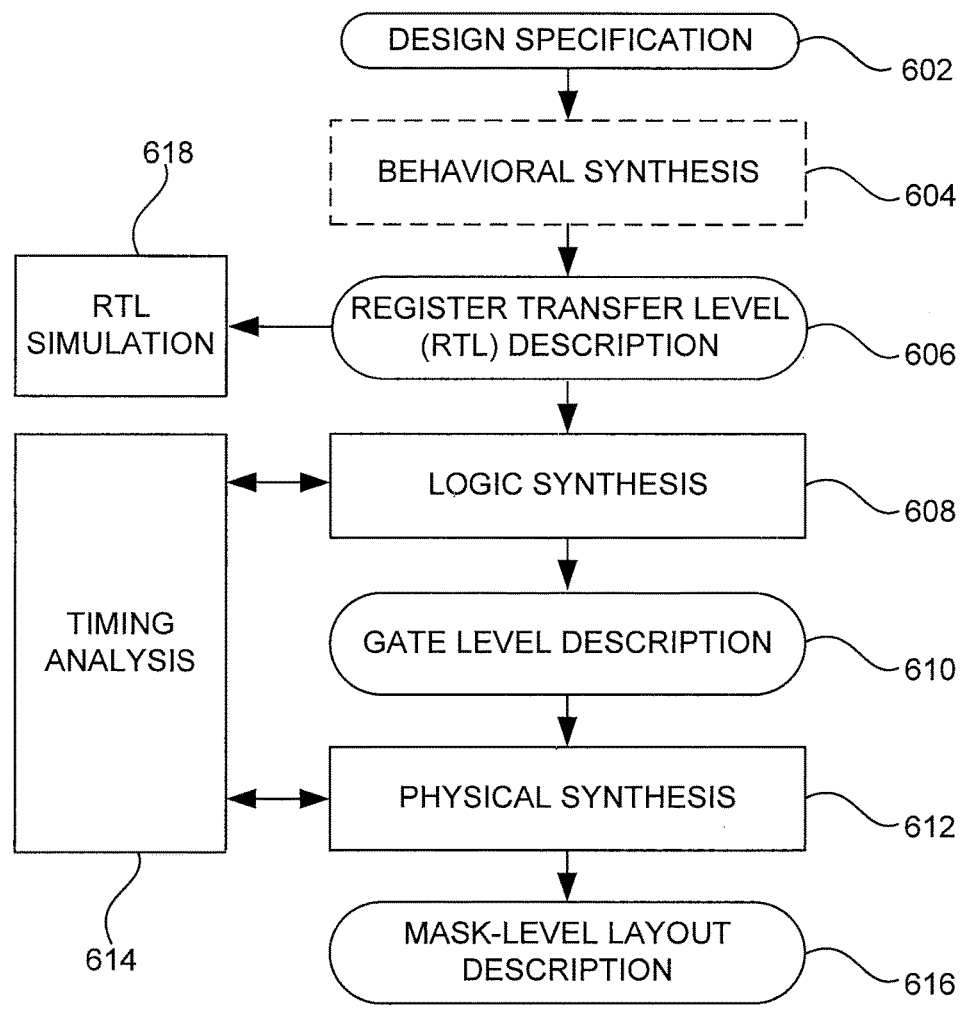
FIG. 6 is a flow chart of illustrative steps for designing an integrated circuit in accordance with an embodiment.

Illustrative operations involved in using tools 520 of FIG. 5 to produce the mask-level layout description of the integrated circuit are shown in FIG. 6.

As shown in FIG. 6, a circuit designer may first provide a design specification 602. The design specification 602 may, in general, be a behavioral description provided in the form of an application code (e.g., C code, C++ code, SystemC code, OpenCL code, etc.). In some scenarios, the design specification may be provided in the form of a register transfer level (RTL) description 606. The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). Alternatively, the RTL description may be provided as a schematic representation.

In general, the behavioral design specification 602 may include untimed or partially timed functional code (i.e., the application code does not describe cycle-by-cycle hardware behavior), whereas the RTL description 606 may include a fully timed design description that details the cycle-by-cycle behavior of the circuit at the register transfer level.

In certain embodiments, design specification 602 or RTL description 606 may include circuit descriptions for read-modify-write operations on signals received from a data path in the design. These read-modify-write operations may have associated timing constraints in the respective circuit descriptions.

In certain embodiments, design specification 602 or RTL description 606 may include optimization constraints such as an upper number of subsets into which a data path may be partitioned for the purpose of limiting the creation of cascaded processing and storage circuits.

Design specification 602 or RTL description 606 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 602, the RTL description 606 (e.g., as a pragma or as an assertion), in a constraint file, or through user input (e.g., using the design and constraint entry tools 564 of FIG. 5), to name a few. In certain embodiments, a given data path may have more than one constraint associated with the path, and some of these constraints may be in conflict with each other (e.g., a constraint received with the behavioral design specification for a given path may conflict with the constraint received with the RTL description and with a constraint received with a constraint file). In this scenario, a predetermined priority of constraints, which may be defined explicitly or resolved implicitly by CAD tools 520, may determine which of the conflicting constraints is selected. For example, the constraint from the user or a configuration file may override the constraints received from other sources, and a constraint received with the RTL description may override a constraint received with the behavioral design specification.

The constraints may target the entire circuit design or portions of the circuit design. For example, some constraints may be defined globally and thus be applicable to the entire circuit design. Other constraints may be assigned locally and thus be applicable only to the corresponding portions of the circuit design. Consider the scenario in which the circuit design is organized hierarchically. In this scenario, every hierarchical instance may include different assignments. In other words, multiple different constraints may target the same portion of the circuit design, and priorities may be defined explicitly or resolved implicitly by CAD tools 520. For example, a constraint defined at a higher level of the design hierarchy may override a constraint at a lower level. Alternatively, a constraint defined at a lower level of the design hierarchy may override a constraint at a higher level, or individual levels of the design hierarchy may be given priority over other levels of design hierarchy.

Constraints included in design specification 602 or RTL description 606 may be conveyed to CAD tools 520 in the form of variables, parameters, compiler directives, macros, pragmas, or assertions, just to name a few. CAD tools 520 may use a constraint file, which may include a portion or all of the constraints. Such a constraint file may be included with design specification 602 or RTL description 606. In some scenarios, a portion or all of the constraints may be embedded in the circuit design. Alternatively, the constraints may have been defined using the design and constraint entry tools 564 (see FIG. 5).

At step 604, behavioral synthesis (sometimes also referred to as algorithmic synthesis) may be performed to convert the behavioral description into an RTL description 606. Behavioral synthesis may evaluate data path implementations for each of the data paths with read-modify-write operations in the behavioral design specification. Each data path evaluation may be followed by the partitioning of the data path into data path subsets and the instantiation of corresponding cascaded processing and storage circuits as illustrated in FIGS. 2 and 3. Step 604 may be skipped if the design specification is already provided in form of an RTL description.

At step 618, behavioral simulation tools 572 may perform an RTL simulation of the RTL description, which may verify the functional performance of the RTL description. If the functional performance of the RTL description is incomplete or incorrect, the circuit designer can make changes to the HDL code (as an example). During RTL simulation 618, actual results obtained from simulating the behavior of the RTL description may be compared with expected results.

During step 608, logic synthesis operations may generate gate-level description 610 using logic synthesis and optimization tools 574 from FIG. 5. If desired, logic synthesis operations may add or remove data path subsets and the corresponding cascaded processing and storage circuitry together with the corresponding pipeline registers as illustrated in FIGS. 2 and 3 according to the constraints that are included in design specification 602 or RTL description 606.

During step 612, physical synthesis operations (e.g., place and route and optimization operations using for example placement and routing tools 576) may place and connect the different gates in gate-level description 610 in a preferred location on the targeted integrated circuit to meet given target criteria (e.g., minimize area and maximize routing efficiency or minimize path delay and maximize clock frequency or any combination thereof). Physical synthesis operation may add or remove data path subsets and the corresponding cascaded processing and storage circuitry together with the corresponding pipeline registers as illustrated in FIGS. 2 and 3 according to the constraints that are included in design specification 602 or RTL description 606. The output of physical synthesis 612 is a mask-level layout description 616.

Circuit design system 400 may include timing estimator 614 (e.g., formed as part of optimization tools 574, tools 576, or tools 578) that may be used to estimate delays between synchronous elements of the circuit design. For example, timing estimator 614 may estimate delays between sequential elements such as registers and storage circuits (e.g., based on the lengths of interconnects, intermediate combinational logic, etc.). The delays may, if desired, be estimated based on metrics such as slack (e.g., the difference between a required arrival time and the arrival time of a signal), slack-ratios, interconnect congestion, or other timing metrics. Circuit design system 400 may use the estimated delays to determine the locations of groups of circuitry while helping to ensure that delays satisfy timing requirements (e.g., critical path delay requirements) or other performance constraints.

Timing estimator 614 may be configured to produce estimated delays that include adjustments for read-modify-write operations, which may include data path partitioning and respective cascaded processing and storage circuitry instantiation.

Consider the scenario in which a circuit design has a given data path width. Consider further that read-modify-write operations on signals from the given data path width misses one or more target criteria. For example, timing estimator 614 may determine that a path in a read-modify-write operation on signals from a given data path is associated with a delay that is larger than the target delay specified for the path as one of the target criteria. Timing estimator 614 may detect that the given path has a larger delay before, during, and after logic synthesis 608 or before, during, and after physical synthesis 612, which may include operations such as clustering, partitioning, placement, and routing, just to name a few. In this scenario, logic synthesis 608 or physical synthesis 612 may increase the number of data path subsets, thereby reducing the width of each individual data path subset and potentially improving the performance of the given path in the read-modify-write operation.

Similarly, consider that the given path meets all target criteria with a large margin. For example, timing estimator 614 may determine that a given path has a delay that is smaller than the target delay specified for the path as one of the target criteria. In this scenario, logic synthesis 608 or physical synthesis 612 may reduce the number of data path subsets, thereby decreasing the number of cascaded processing and storage circuits and the corresponding pipeline registers.

Figure 7:
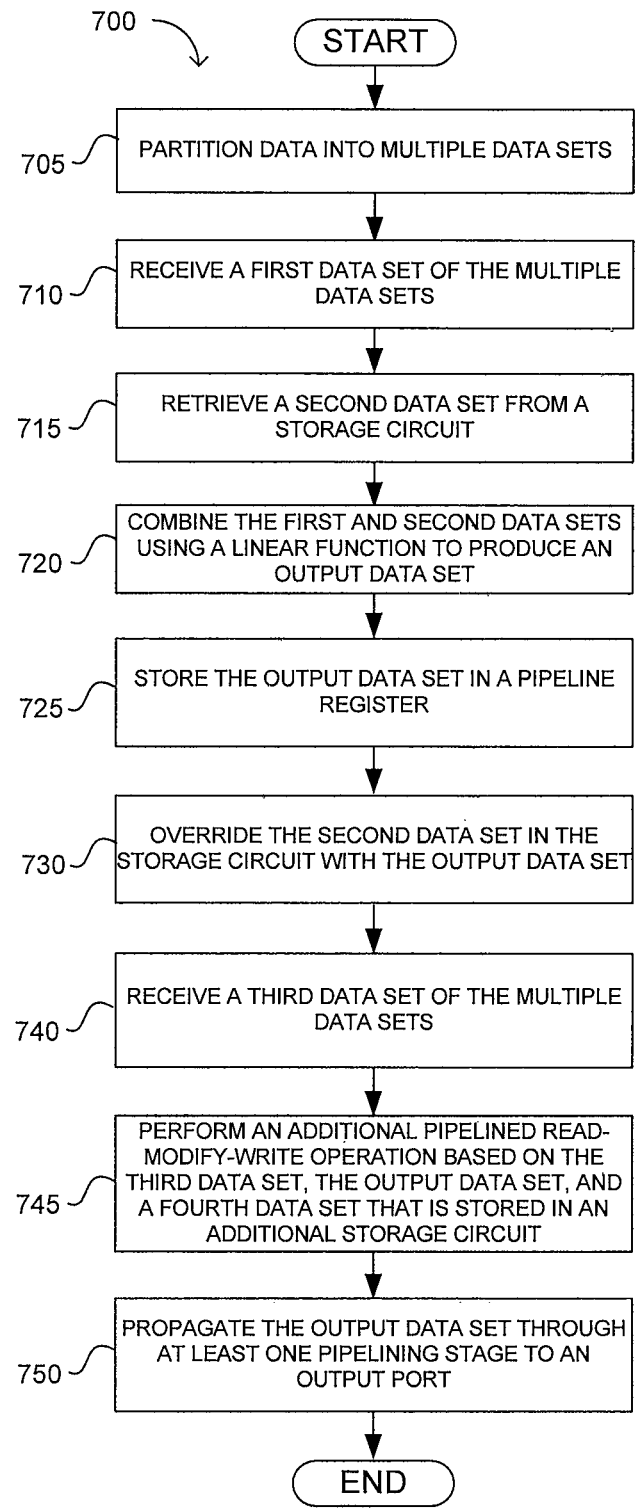
FIG. 7 is a flow chart showing illustrative steps for performing read-modify-write operations on wide data paths using pipelined circuitry with cascaded processing circuits in accordance with an embodiment.

FIG. 7 is a flow chart showing illustrative steps that pipelined circuitry with cascaded processing and storage circuits may execute when performing read-modify-write operations on wide data paths. During step 705, the data may be partitioned into multiple data sets such that each processing and storage circuit may execute a read-modify-write operation within one or two clock cycles.

During step 710, a processing circuit in the first slice of the pipelined circuitry may receive a first data set of the multiple data sets. During step 715, the processing circuit may retrieve a second data set from a storage circuit in the first slice of the pipelined circuitry. During step 720, the processing circuit may combine the first and second data sets using a linear function to produce an output data set. For example, the processing circuit may perform an addition, a multiplication, a subtraction, a division, any combination thereof, or any other linear function on the first and second data sets. During step 725, a pipeline register in the first slice of the pipelined circuitry may store the output data set, which may be used to override the second data set in the storage circuit during step 730.

During step 740, a processing circuit in a second slice of the pipelined circuitry may receive a third data set of the multiple data sets and perform an additional pipelined read-modify-write operation based on the third data set, the output data set, and a fourth data set that is stored in an additional storage circuit during step 745. During step 750, the first slice of the pipelined circuitry may propagate the output data set through at least one pipelining stage to an output port.

Figure 8:
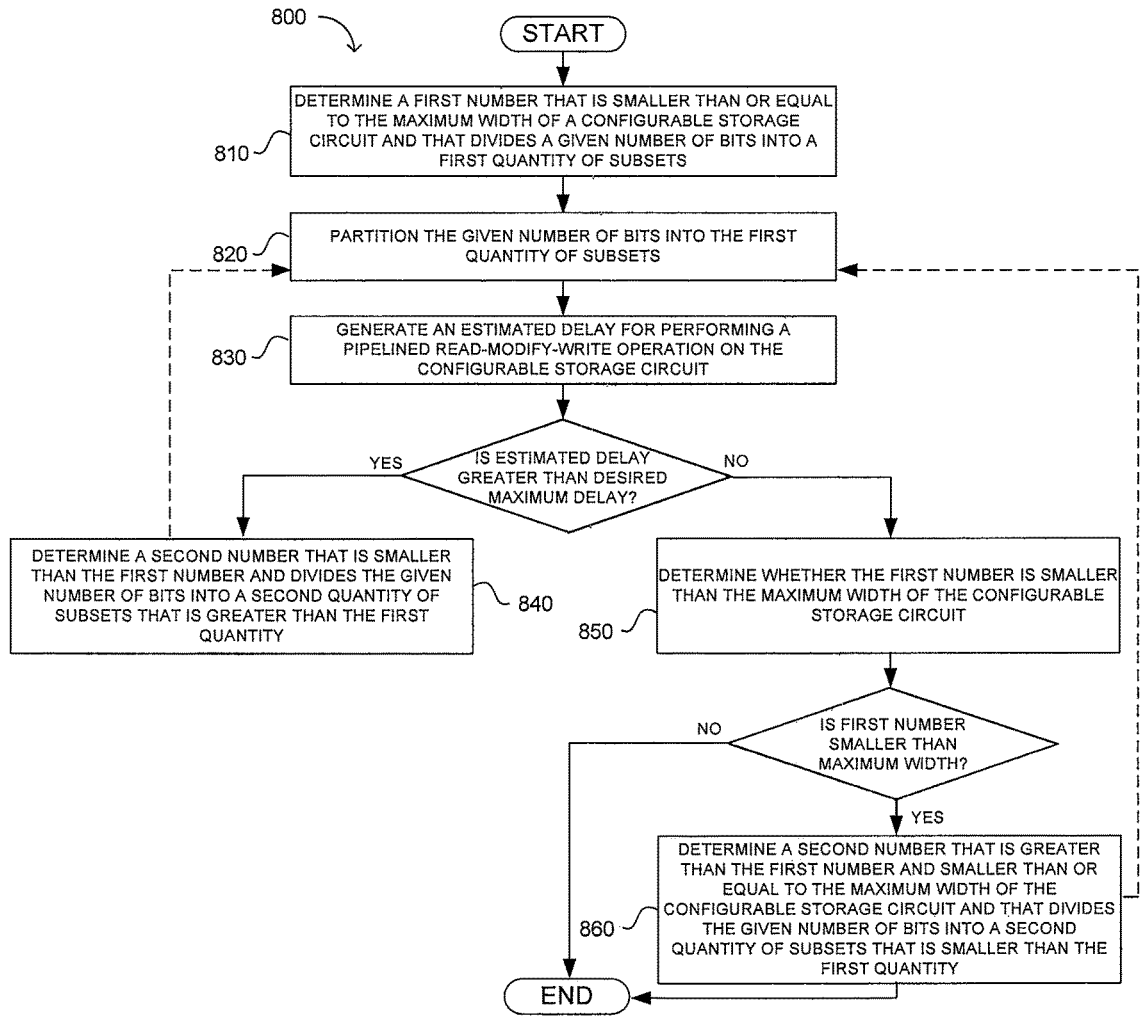
FIG. 8 is a flow chart showing illustrative steps for partitioning a wide data path into subsets for performing read-modify-write operations using cascaded processing and storage circuits in accordance with an embodiment.

CAD tools such as CAD tools 520 of FIG. 5 may determine the appropriate number of slices for the pipelined circuitry of FIG. 7. FIG. 8 is a flow chart showing illustrative steps that a CAD tool may perform when partitioning a wide data path into subsets for performing read-modify-write operations using cascaded processing and storage circuits.

During step 810, the CAD tool may determine a first number of bits that is smaller than or equal to the maximum width of a configurable storage circuit and that divides a given number of bits into a first quantity of subsets. For example, a data path may be 120 bits wide and the configurable storage circuit may have a maximum width of 40 bits. In this example, the CAD tool may divide the 120 bits into three subsets of 40 bits each.

During step 820, the CAD tool may partition the given number of bits into the first quantity of subsets. For example, the CAD tool may assign the 40 most significant bits (MSBs) to a first subset, the next 40 bits to a second subset, and the 40 least significant bits (LSBs) to a third subset. During step 830, the CAD tool may generate an estimated delay for performing a pipelined read-modify-write operation on the configurable storage circuit (e.g., for performing a read-modify-write operation on memory 311 using linear function block 331 and pipeline register 321 of FIG. 3A).

The CAD tool may determine whether the estimated delay is greater than a desired maximum delay. In response to determining that the estimated delay is greater than a desired delay, the CAD tool may determine a second number of bits that is smaller than the first number and that divides the given number of total bits into a second quantity of subsets that is greater than the first quantity during step 840. For example, the CAD tool may divide the 120 bits into four subsets of 30 bits each or into six subsets of 20 bits each. If desired, the CAD tool may then return to step 820 for further processing.

In response to determining that the estimated delay is not greater than the desired delay, the CAD tool may determine whether the first number of bits is smaller than the maximum width of the configurable storage circuit during step 850. In response to determining that the first number is smaller than the maximum width, the CAD tool may determine a second number of bits that is greater than the first number of bits and smaller than or equal to the maximum width of the configurable storage circuit and that divides the given number of total bits into a second quantity of subsets that is smaller than the first quantity during step 860. If desired, the CAD tool may return to step 820 for further processing.

The memory array of the configurable storage block described herein may be implemented using any storage technology (e.g., static random access memory (SRAM), dynamic random access memory (DRAM), flash memory, etc.). The functions implemented by the configurable storage block may apply to any memory array capacity, latency, and bandwidth, memory data-path implementation (e.g., common input-output (I/O) or split input-output (I/O)), number and type of configurable storage block interface ports, command/address/read-write control protocol, interface signaling method (e.g., parallel or serial), and the physical integration topology of the configurable storage block (e.g., single-die, 2.5-dimensional multiple-die, 3-dimensional stacked die coupled by through-silicon-vias (3D TSV)).

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), digital signal processors (DSPs), graphics processing units (GPUs), just to name a few.

The integrated circuit described herein may be part of a data processing system that includes one or more of the following components; a processor; memory; I/O circuitry; and peripheral devices. The integrated circuit can be used in a wide variety of applications, such as computer networking, data networking, instrumentation, video processing, digital signal processing, or any suitable other application where the advantage of using cascaded processing and storage circuitry for read-modify-write operations on signals from data paths is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for operating an integrated circuit, comprising:
   receiving data from a data path;
   partitioning the data into multiple data sets, wherein the multiple data sets include first and second data sets;
   receiving the first data set of the multiple data sets at a first input port;
   retrieving a third data set from a first storage circuit;
   using a first processing circuit to perform a pipelined read-modify-write operation based on the first and third data sets, wherein using the first processing circuit to perform the pipelined read-modify-write operation based on the first and third data sets comprises generating an output data set based on the first and third data sets;
   receiving the second data set of the multiple data sets at a second input port;
   retrieving a fourth data set from a second storage circuit; and
   using a second processing circuit to perform a pipelined read-modify-write operation based on the output data set from the first processing circuit, the second data set, and the fourth data set.

2. The method of claim 1, wherein generating the output data set based on the first and third data sets comprises combining the first and third data sets using a linear function.

3. The method of claim 2, further comprising:
   generating a carry signal from the first and third data sets based on the linear function.

4. The method of claim 1, further comprising:
   storing the output data set in a pipeline register.

5. The method of claim 4, further comprising:
   overriding the third data set in the first storage circuit with the output data set that is stored in the pipeline register.

6. The method of claim 1, wherein using the second processing circuit to perform the pipelined read-modify-write operation further comprises:
   generating an additional output data set based on the second data set, the output data set, and the fourth data set.

7. The method of claim 6, further comprising:
   storing the additional output data set in an additional pipeline register; and
   overriding the fourth data set in the second storage circuit with the additional output data set that is stored in the additional pipeline register.

8. The method of claim 1, further comprising:
   propagating the output data set through at least one pipelining stage to an output port.

9. A method for operating a computer aided design tool to implement a circuit design in a programmable integrated circuit, comprising:
   determining a first number that is smaller than or equal to the maximum width of a configurable storage circuit in the circuit design, wherein the first number divides a given number of bits into a first quantity of subsets;
   partitioning the given number of bits into the first quantity of subsets, wherein a first subset of the first quantity of subsets includes a first number of bits;
   generating an estimated delay for performing a pipelined read-modify-write operation on the configurable storage circuit using the first number of bits;
   determining whether the estimated delay is greater than a desired maximum delay constraint; and
   generating a mask-level layout description of the programmable integrated circuit after determining whether the estimated delay is greater than the desired maximum delay constraint.

10. The method of claim 9, further comprising:
    in response to determining that the estimated delay is greater than the desired maximum delay constraint, identifying a second number that is smaller than the first number, wherein the second number divides the given number of bits into a second quantity of subsets, and wherein the second quantity is greater than the first quantity.

11. The method of claim 9, further comprising:
    in response to determining that the estimated delay is less than the desired maximum delay constraint, determining whether the first number is smaller than the maximum width of the configurable storage circuit.

12. The method of claim 11, further comprising:
    in response to determining that the first number is smaller than the maximum width of the configurable storage circuit, identifying a second number that is greater than the first number and smaller than or equal to the maximum width of the configurable storage circuit, wherein the second number divides the given number of bits into a second quantity of subsets, and wherein the second quantity is smaller than the first quantity.

13. An integrated circuit comprising:
    an output;
    a plurality of inputs that receives input data;
    first processing and storage circuitry that includes a first processing circuit and a first storage circuit, wherein the first processing circuit receives a first subset of the input data from a first input in the plurality of inputs and receives first stored data from the first storage circuit, and wherein the first processing circuit generates first output data based on the first subset of input data and the first stored data, writes the first output data into the first storage circuit, and sends the first output data to the output; and second processing and storage circuitry that includes a second processing circuit and a second storage circuit, wherein the second processing circuit receives a second subset of input data from a second input of the plurality of inputs, second stored data from the second storage circuit and the output data from the first processing circuit, and wherein the second processing circuit generates second output data based on the second subset of input data, the second stored data, and the output data.

14. The circuit of claim 13, further comprising:
at least one pipeline register coupled between the first processing circuit and the first storage circuit.

15. The circuit of claim 13, further comprising:
at least one pipeline register coupled between the first and second processing and storage circuitries.

16. The circuit of claim 13, further comprising:
at least one pipeline register coupled between the second input and the second processing and storage circuitry.

17. The circuit of claim 13, further comprising:
at least one pipeline register coupled between the first processing and storage circuitry and the output.

18. The circuit of claim 13, wherein the first processing circuit executes a linear function on the first subset of the input data to generate the first output data.

19. The circuit of claim 18, wherein the linear function is a function selected from the group consisting of: addition, multiplication, subtraction, and division.

20. The circuit of claim 13, wherein the first processing circuit is implemented in a programmable logic device.

* * * * *